United States Patent [19]

Peck et al.

[11] Patent Number: 5,018,672
[45] Date of Patent: May 28, 1991

[54] ORGANIC MATERIAL REDUCTION APPARATUS

[75] Inventors: R. Michael Peck, Lancaster; Thomas R. Hecht, Manheim; Howard F. Livingston, Lancaster, all of Pa.

[73] Assignee: Kathcon, Inc., Lancaster, Pa.

[21] Appl. No.: 441,470

[22] Filed: Nov. 27, 1989

[51] Int. Cl.⁵ .................................. B02C 18/14
[52] U.S. Cl. .................................. 241/37.5; 241/55; 241/56; 241/73; 241/92; 241/101.7
[58] Field of Search ............... 241/101.1, 101.7, 56, 241/152 R, 74, 92, 86.1, 89, 89.1, 89.2, 89.3, 36, 50, 55, 152 A, 73, 37.5

[56] References Cited

U.S. PATENT DOCUMENTS

| | | | |
|---|---|---|---|
| 2,181,397 | 11/1939 | Everett | 241/55 |
| 2,418,990 | 4/1947 | Sheldon | 241/50 X |
| 2,822,846 | 2/1958 | Ward . | |
| 2,869,793 | 1/1959 | Montgomery | 241/50 |
| 3,986,676 | 10/1976 | Husmann . | |
| 4,477,029 | 10/1984 | Green . | |
| 4,503,893 | 3/1985 | Demopoulos | 241/92 X |
| 4,580,735 | 4/1986 | Lange . | |
| 4,778,117 | 10/1988 | Karg . | |
| 4,824,034 | 4/1989 | Baker . | |
| 4,951,882 | 8/1990 | Ober | 241/92 X |

FOREIGN PATENT DOCUMENTS 3215331 10/1983 Fed. Rep. of Germany .

OTHER PUBLICATIONS

European Patent Application, 134378, 3-85.

*Primary Examiner*—Mark Rosenbaum
*Attorney, Agent, or Firm*—Watson, Cole, Grindle & Watson

[57] ABSTRACT

A readily portable apparatus for the size reduction of vegetable and cellulosic material is disclosed. A first shredding means having a plurality of knives is coaxially disposed with an impellar. After contacting the shredding knives the impeller directs the partially shredded material to a contacting screen or impediment which further reduces the size of the vegetable and cellulosic material. The contacting screen is pivotally movable to promote the flow of material to a discharge chute for collection. The apparatus includes means to convert the apparatus to a leaf blower and provides for attachment of a vacuum collection means. Novel safety features preventing access to moving portions of the apparatus are also disclosed and claimed.

19 Claims, 3 Drawing Sheets

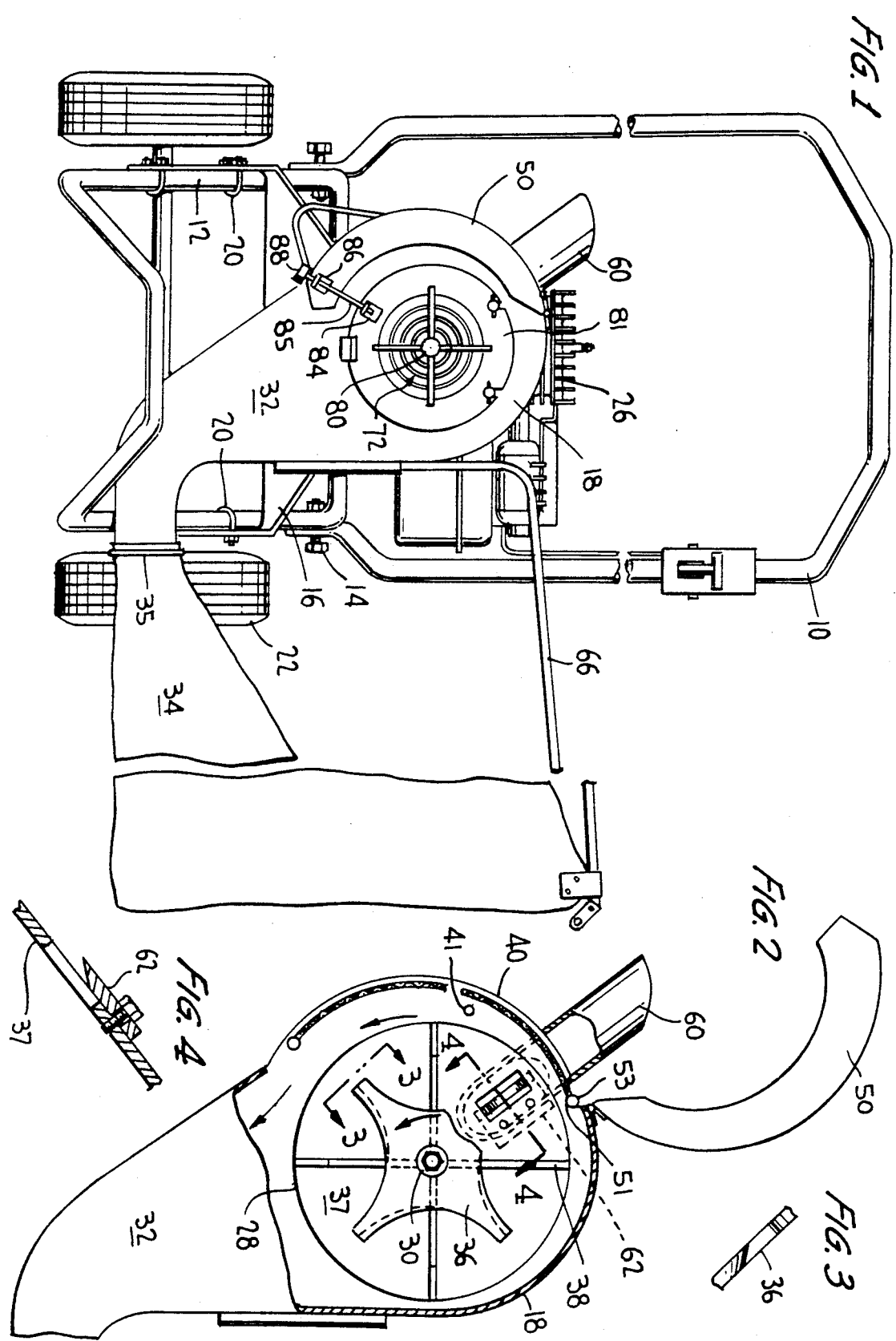

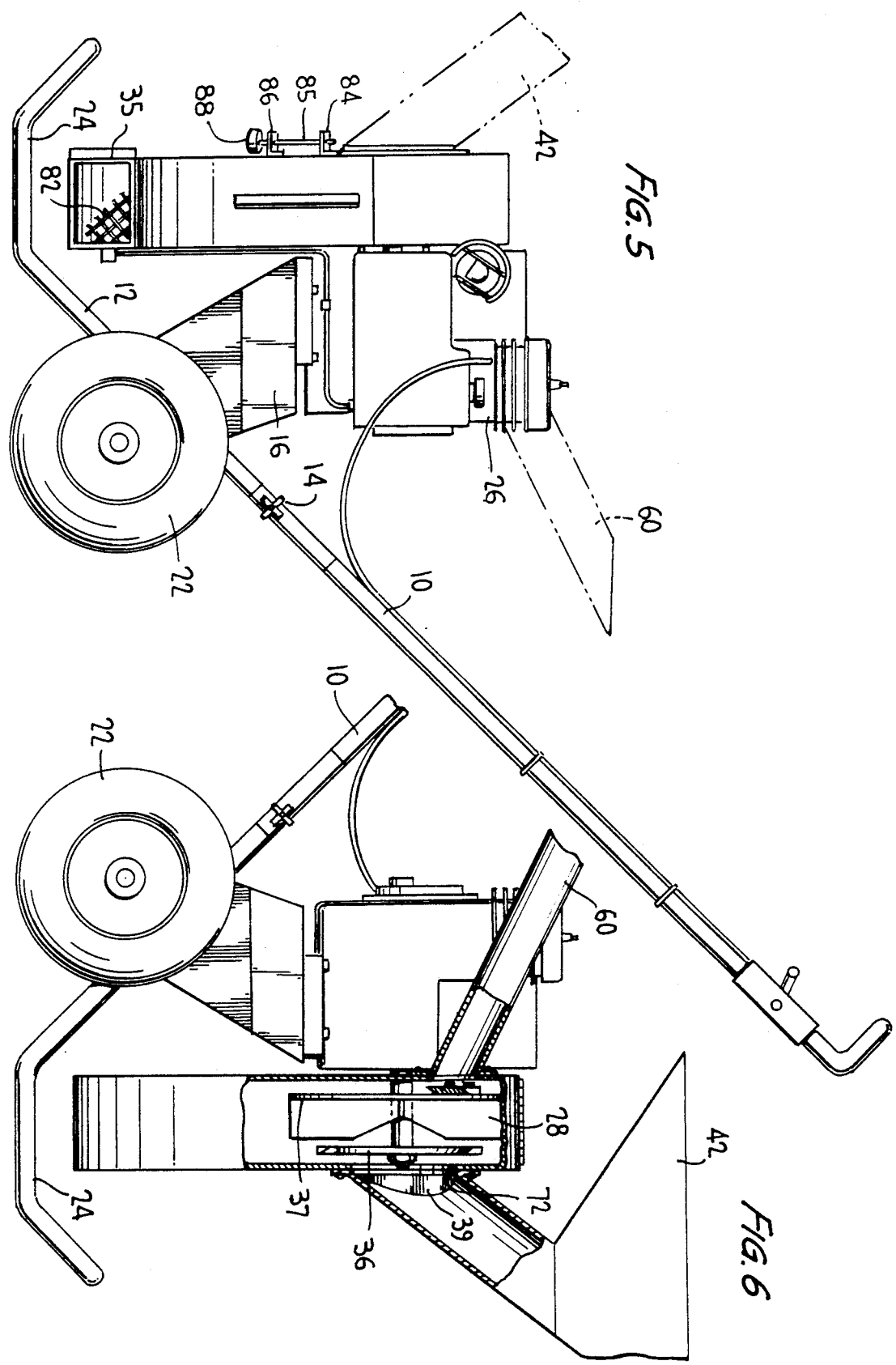

ORGANIC MATERIAL REDUCTION APPARATUS

The present invention relates generally to an apparatus for size reduction of vegetable and cellulosic matter for disposal, mulching or composting, and more specifically, to a shredding and chipping apparatus having a coaxially disposed arrangement of shredding knives, impeller means and screens to facilitate the shredding of leaves and cellulosic materials and a separate chipper knife coaxially disposed with the shredding knives and impeller and cooperating with the same power source to provide chipping of larger cellulosic materials of up to about 1½ inches in diameter. The apparatus is mobile and is particularly adapted for use as a garden and lawn implement. The apparatus may be converted for use as a leaf blower by positioning a safety shield over the shredder inlet port and utilizing the impeller means as a source of positive pressure air. Additionally, a vacuum conduit may be affixed to the shredder inlet port to facilitate leaf and general light refuse shredding and removal from lawns and garden areas.

It is recognized that the size reduction of vegetable and cellulosic matter is desirable to facilitate disposal, mulching and/or provide for efficient composting of the materials. It has long been recognized that the reduction of the size of vegetable matter facilitates the composting process by providing a greater density and hence surface contact of the compost.

Conventional means to attain the size reduction of lawn and garden vegetable and cellulosic matter include chipping knives and shredder knives used in conjunction with pneumatic or impeller means to direct the material to and into contact with the shredder and/or chipper knives. The material of reduced size is then conducted via conduit to a container, e.g., a collection bag or delivery vehicle. U.S. Pat. No. 4,824,034 to Baker teaches a multiple entry shredder/chipper having a plurality of knives and a screened discharge to provide selected sizing of the processed materials. U.S. Pat. No. 3,986,676 to Husmann discloses a paper shredding apparatus having shredding knives coaxially disposed with a screening drum and blower vanes to promote discharge of the shredded material through the screen openings. U.S. Pat. No. 4,580,735 to Lange and U.S. Pat. No. 4,477,029 to Green disclose portable shredders/chippers having separate charging chutes for larger cellulosic materials, e.g., sticks and branches, and smaller vegetable matter, e.g., leaves, twigs, weeds and small plants. These conventional devices do not provide the consistent sizing of materials inherent in the cooperative use of the shredder knives, impeller and screens of the instant invention. Additionally, conventional shredders and chippers do not provide the self cleaning screens presented in the instant invention, nor, with minimal adaptation, convert the apparatus to serve as a leaf vacuum or leaf blower.

SUMMARY OF THE INVENTION

It is therefore a feature of the present invention to provide an apparatus for reducing the size of vegetable and cellulosic materials by the cooperative implementation of an impeller means to direct the material to a shredding means and promote contact of the material with further shredding means comprising an impediment having a plurality of openings to promote further size reduction of the material by allowing the material to contact and flow through and against such impediment.

It is another feature of the invention to provide a construction for a mobile shredder and chipper apparatus presenting a substantially unitary and compact construction and providing means for convenient gathering of vegetable and cellulosic material for size reduction processing.

It is yet another feature of the present invention to provide a size reduction apparatus for vegetable and cellulosic material having an impeller means which may be adapted for use as a blower.

It is another and further feature of the invention to provide a construction for a vegetable and cellulosic size reduction apparatus wherein the shredder is comprised of a plurality of blades, preferably about four blades disposed equidistantly about an axis and upstream of the impeller means and cooperating with the impeller means to direct the stream of material into contact with pivoted screens to provide further size reduction of the material.

It is a further feature of the invention to provide a construction for a vegetable and cellulosic size reduction apparatus which provides a consistently uniform processed material size to promote efficient composting of the subject material and/or facilitate ready compaction of the material for disposal in land fills and like solid waste disposal facilities.

Briefly, in its broader aspects, the present invention comprehends the cooperative combination of an assembly of shredding, impeller and impediment means to provide the efficient and consistent size reduction of vegetable and cellulosic materials. The assembly comprises a shredding means having a plurality of equidistant blades disposed upon an axis and located upstream of an impeller means. The impeller means is comprised of a drum having a plurality of inwardly directed blades or vanes and an impediment means, placed downstream of the impeller means, to provide a contact surface for the stream of material and promote further sizing of the material. Coaxially mounted with the shredder knives and impeller blades is a chipper knife to facilitate size reduction of larger cellulosic pieces of up to 1½ inches in diameter.

Further objects, advantages and features of the present invention will become more fully apparent from a detailed consideration of the arrangement and construction of the constituent parts as set forth in the following description taken together with the accompanying drawings.

BRIEF DESCRIPTION OF THE DRAWING

FIG. 1 is a front elevational view of the mobile shredding apparatus of the present invention;

FIG. 2 is a partial cut away elevational view of the impeller area of FIG. 1;

FIG. 3 is a view along line 3—3 of FIG. 2;

FIG. 4 is a view along line 4—4 of FIG. 2;

FIGS. 5 is a side elevational view of the shredding apparatus of the instant invention;

FIG. 6 is a partial cut away side elevational view of the shredding apparatus of the instant invention;

DETAILED DESCRIPTION OF THE PREFERRED EMBODIMENTS

Figure 7:
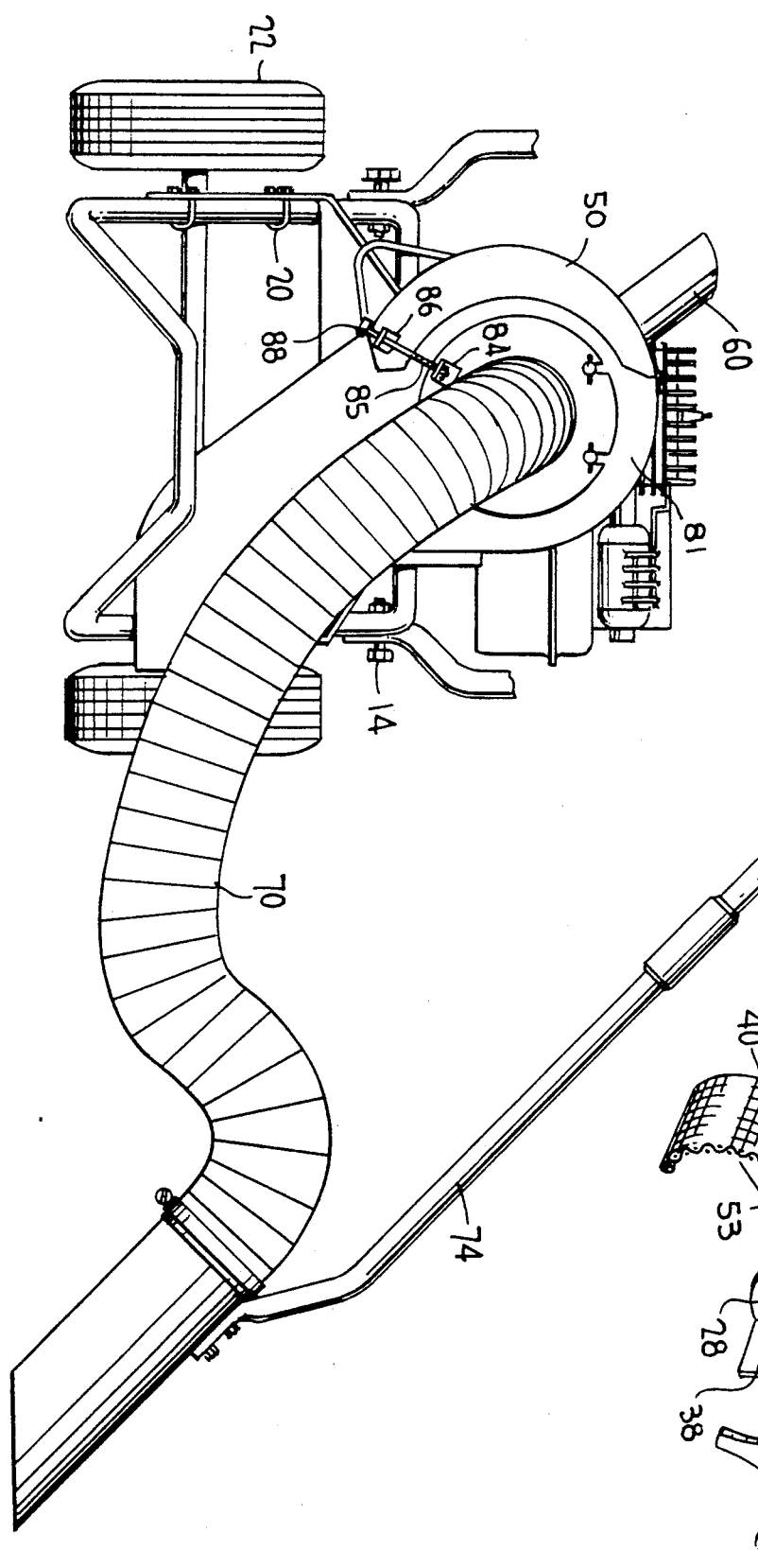
FIG. 7 is a front elevational view of the shredding apparatus showing attachment of a vacuum hose collection means; and, FIG. 8 is an exploded view of the axially mounted impeller and cooperating shredding means of the present invention.

Referring first to FIGS. 1 and 2, shown is the shredder and chipper of the instant invention disposed upon a convenient and light weight transport means. The transport means comprises a tubular metal support frame having handle means 10 and chassis support means 12. The handle 10 is fixedly attached to the chassis support means by carriage bolts 14. The chassis body 16 for the impeller housing 18 is fixedly attached to the chassis support means 12 by U-bolts 20. Mounted to the chassis support means 12 are cooperating wheel and axle means 22. As seen in FIG. 5, the portion of the chassis support means 12 located distally of the handle attachment means provides a stationary support stand 24 for the shredder and chipper. The chassis body 16 and fixedly mounted shredder and chipper assembly may be removed from the transport means and positioned on a flat bed truck or fixedly mounted to any flat surface accommodating the weight and size of the apparatus.

Figure 8:
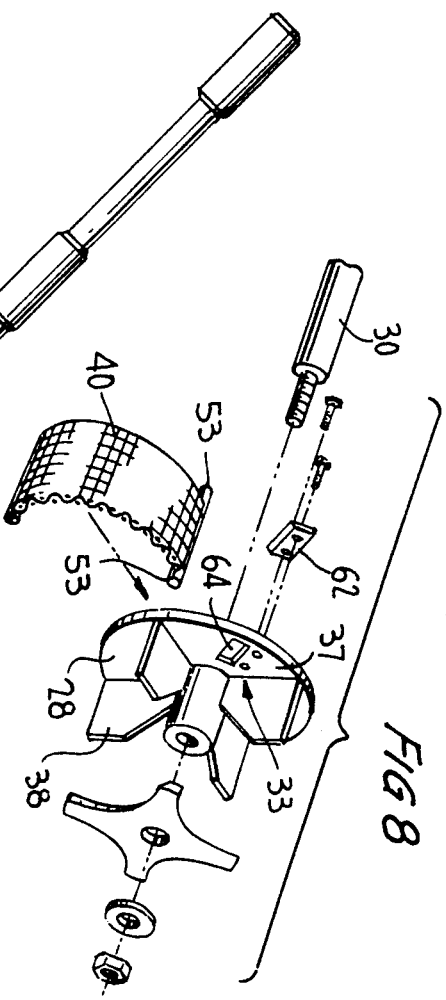

The shredder and chipper of the invention may be powered by a conventional internal combustion gasoline engine 26. The engine 26 may be electrically powered or use any mode of mechanical energy creation suitable to rotate the impeller 28 which is positioned within the impeller housing 18. Conventional gearing and mechanical energy transfer means (not shown) may be used to provide power transfer to the operative elements of the shredder. As may be seen in FIG. 2, the impeller housing 18 is substantially circular in the upper area of the impeller and increases slightly in radius from the input of chipper chute 60 to the beginning of the delivery chute 32. The delivery chute 32 narrows to promote delivery of shredded material to a collection bag 34 through discharge opening 35. The impeller 28 promotes the delivery of material to the shredder knives 36. As viewed in FIG. 6, the material to be shredded contacts the shredder knives 36 and enters into the spaces between the impeller blades 33 (FIG. 8). The shredder knives are generally manufactured of materials possessing the requisite strength and ability to hold a sharpened edge as required for the instant purposes. It has been found that AISI 43/40 steel, high carbon spring steel, or like alloys are acceptable in this capacity. The knives, as shown in FIG. 2, rotate counterclockwise on axial shaft 30. As shown in FIG. 3, the edge of blades 36 are honed to present a sharpened leading edge with respect to the counter-clockwise rotational movement of the shredder knives 36. The knives are generally about one and one half to two and one half inches in length, preferably about two inches as measured from the center of axial shaft 30 and have a material thickness of about 0.15 to 0.20 inches. As shown in FIG. 6, a baffle plate 39 may be located at the terminal end of feed hopper 42 or like chute delivery means and is used to direct the leaves and like cellulosic material to be shredded to the down cutting side of the shredder knives 36. This avoids the kick back problems which may be caused by introduction of material at the up cutting side of knives 36.

The partially shredded material is then delivered by cooperation of the impeller blades 38 and the containment provided by the back of the impeller 37 to the shredding screens 40. The shredding screen 40 provide a surface for further shredding as the material moves in the direction of the arrows of FIG. 2 toward the chute 32. A portion of the partially shredded material passes through the screens 40 for additional size reduction. It has been found that the use of the shredder knives 36 in cooperation with the shredding screens 40 provides an optimal size reduction of leaves and other common garden and lawn vegetable matter for sizing in the range of $\frac{1}{4}$ to 1 inches, and preferably in the range of $\frac{1}{4}$ to $\frac{1}{2}$ inches.

The shredding screens may be of conventional expanded sheet metal having diamond shaped spaces of about $\frac{1}{4}$ to $\frac{3}{4}$ inches in the lesser dimension and about 1 to 2 inches in the greater dimension, preferable in the range of $\frac{3}{8}$ to $\frac{3}{4}$ inches in the lesser dimension and $1\frac{1}{4}$ to $\frac{3}{4}$ inches in the greater dimension. The shape of the screen spaces is not critical and may be square, rectangular, circular or oval. The principal criteria is the presentation of an impediment, i.e., a shredding surface permitting a portion of the material to pass through the screen spaces.

Shredding screens of varying length may be provided depending upon the degree of size reduction sought. The more screen surface to which the material is exposed, the greater the size reduction of the material. It has also been found that for wet vegetable and cellulosic material a shorter screen 40 facilitate processing. Additionally, the screens are pivoted to provide movement of the screens relative to the impeller housing 18. The pivoting of the screens allows material build-up and clogging to be substantially eliminated in the instant apparatus and facilitates self cleaning of the screens. Generally, the space between the periphery defined by the impeller blades and the shredder screen surface is in the range of $\frac{1}{4}$ to 1 inch, preferably about $\frac{3}{8}$ to $\frac{5}{8}$ inches and most preferably about $\frac{1}{2}$ inches. The shredding screen 40 may also be an arcuate substantially rectangular structure as depicted at FIG. 8, but comprised of substantially parallel steel rods having their length disposed coaxially to the axis of rotation of impeller 28. The rods may have a diameter of approximately 0.12 inches and be disposed along the length of the screen at $\frac{1}{2}$ inch centers. To maintain the general arcuate shape and provide sufficient strength to the screen, the rectangular outer structure of the screen would generally be of 0.25 steel rod or material of like structural character.

As seen in FIG. 2, the impeller 28 is mounted on axial shaft 30. The impeller 28 comprises the impeller blades 38 and an impeller backing plate 37. The impeller blades 38 are fixedly attached to the backing plate 37. The backing plate provides a containment surface for the material which has passed from the shredder knives 36 to a position within the impeller structure between the impeller blades 38. The material is then directed by the air flow generated by the impeller and centrifugal force against the screen 40. As seen at FIG. 2, the screen 40 is fixedly positioned at one end by cooperating notch 51 and cover hatch 50. When the cover hatch 50 is closed, the tubular or node portion 53 (FIG. 8) of the screen 40 is held in cooperating notches 51 located on each side of the impeller housing 18. The screen 40 is readily removable by lifting the hatch 50. The lower or downstream portion of screen 40 is not fixedly positioned inside the impeller housing 18. A screen stop 41 is located between the shredder screen 40 and the periphery of the impeller 28. The stop 41 prevents impingement of the screen on the impeller during start up and operation of the apparatus. The pivotal affixation of the screen 40 allows the screen to move relative to impeller 28 which is delivering material to the screen. This ability to move relative to the contacting load of material aids in the elimination of clogging of the material during this additional size reduction processing of the material.

As may be noted at FIGS. 2 and 8, the backing plate 37 of the impeller 28 is provided with a chipper means which cooperates with chipper feed chute 60. Sticks and limbs of up to about 1 ½ inches may be fed into chute 60 for contacting with chipping knife 62 which is fixedly mounted on impeller backing plate 37. The chipped material passes through opening 64 in the impeller backing plate and is fed by centrifugal force and impeller induced air drafting to the screens 40. Generally, chipped material is not further reduced by contacting with the screen 40 and passes down chute 32 for delivery to bagging means 34. If the primary function of the apparatus at a given time is chipping using the chipper feed chute 60, it may facilitate and increase the efficiency of operation to remove the shredding screen 40.

As seen in FIG. 1, the bagging means 34 is held in fixed relationship to the shredding apparatus by rod or tubular elements 66. As may be seen from FIG. 6, the chipper chute 60 feeds in rearwardly of the impeller housing. The feed chute or hopper 42 feeds in frontwardly of the impeller housing to facilitate preliminary contacting of the cellulosic material with the shredding knives 36 prior to entry into the impeller for subsequent delivery to the screen 40.

FIG. 7 presents an embodiment of the invention wherein the chute 42 is removed and replaced by a vacuum hose attachment 70. As may be seen at FIG. 6, the impeller housing has a shredder inlet port 72 for delivery of material internally to the associated shredding apparatus located within the impeller housing. Generally, the chute 42 and inlet cover plate 81 are fixedly attached by conventional means, e.g., lug nuts and cooperating bolts or like affixation means at the opening 72. However, as shown in FIG. 7, a vacuum hose means may be attached at opening 72 to provide a means to deliver cellulosic material to the shredder. A handle means 74 is shown to allow convenient movement of the vacuum head during use.

In addition to the vacuum means to promote feeding of leaves and light refuse to the shredding apparatus, means are provided to readily convert the apparatus to a conventional type leaf blower. As shown in FIG. 1, a guard means 80 cooperating with cover plate 81 may be placed over opening 72 to allow the influx of air under the influence of impeller means 28. Additionally, a guard means 82 (FIG. 5) is placed over the discharge opening 35 of chute 32 to prevent the discharge of any high velocity projectiles from the apparatus in the blower mode. As so converted, the apparatus may be used as a conventional blower by directing the impeller driven effluent air exiting from the chute 32. The velocity of the effluent air flow is readily varied by control of the RPMs of engine 26.

As an additional safety factor, deactivating switches (not shown) may be positioned at and cooperate with the cover hatch 50, and the appliance, i.e., bag 34 or guard means 82, affixed over the discharge opening 35. When the hatch is opened or the appliance removed, the respective switch will activate and immediately turn off the engine. One among a number of means available, is the connection of the deactivation switches to the magneto of the engine 26. Specific safety means have been devised to prevent access to the impeller area through the cover hatch 50 or the shredder inlet port 72 prior to coast down of the engine. As seen at FIG. 1, the cover plate 81 cooperates with a particular appliance, i.e., hopper 42, vacuum conduit 70, or the guard means 80, to cover the port 72 to the impeller housing 18. Integrally affixed to the cover plate 81 is a threaded bracket 84. Integrally affixed to cover hatch 50 is threaded bracket 86. Threaded rod 85, having an enlarged end portion or knob 88, cooperates to thread through the holes positioned in brackets 84 and 86. As noted earlier, the cover hatch 50 is provided with a deactivating switch (not shown), e.g., a conventional automobile door light switch. When the cover hatch is opened, the switch deactivates the engine. However, access to the impeller area must be curtailed until coast down of the engine and associated impeller. As will be noted, the cover hatch 50 or the appliance cover plate 81 can not be removed until the threaded member 85 is disengaged from the bracket 84. During the disengaging process, the hatch is opened enough to deactivate the engine but requires further rotation of knob 88 to disengage the threaded rod 85 from bracket 84. During this additional operation of disengagement, the coast down of the engine is completed. Thus access to the impeller housing is prevented while the impeller is turning. Additionally, unless the cover plate 81 is in place and the cover hatch 50 closed by fixed attachment of threaded rod 85 through brackets 84 and 86, the engine can not be started.

While there has been shown and described what is considered to the preferred embodiments of the present invention, it will be apparent to those skilled in the art to which the invention pertains that various changes and modifications may be made therein without departing from the invention as defined in the appended claims.

It is claimed:

1. Apparatus for the size reduction of vegetable and cellulosic material comprising a housing, said housing including an inlet opening for introducing material into said housing and a discharge opening for discharging material from said housing, a drive shaft extending into said housing, impeller means connected to said drive shaft, shredding means connected to said drive shaft and being disposed between said impeller means and said inlet opening for shredding material passing into the housing through said inlet opening and reducing the size of the material, and screen means disposed radially outwardly of said impeller means so that material passing radially outwardly from the impeller means impinges upon said screen means, said screen means being supported by said housing for movement toward and away from said impeller means during operation of the apparatus to prevent clogging of material between said impeller means and said screen means.

2. Apparatus as defined in claim 1 wherein said screen means is of substantially arcuate configuration including opposite and portions, one of said end portions being pivotally supported by said housing so that the screen means can pivot toward and away from said impeller means.

3. Apparatus as defined in claim 2 including stop means for engaging said screen means for limiting movement thereof toward said impeller means to prevent engagement of said screen means with said impeller means.

4. Apparatus as defined in claim 1 wherein said impeller means comprises a plurality of blades having opposite side edges, the impeller means including a backing plate disposed at one of the side edges of said blades and forming a containment surface for limiting movement of material in one direction along said drive shaft.

5. Apparatus as defined in claim 1 wherein said housing includes a cover hatch mounted for movement relative to said housing, a cover plate secured to said housing adjacent said inlet opening, and safety means interconnecting said cover hatch with said cover plate to delay opening of said cover hatch and access to the interior of the housing.

6. Apparatus as defined in claim 1 including a feed hopper operatively associated with said inlet opening for feeding material through said inlet opening and into said housing so that the apparatus serves as a shredder.

7. Apparatus as defined in claim 1 including a vacuum hose operatively associated with said inlet opening so that the apparatus can be employed to gather material.

8. Apparatus as defined in claim 1 including first guard means operatively associated with said inlet opening and a second guard means operatively associated with said discharge opening so that the apparatus serves as a blower.

9. Apparatus for the size reduction of vegetable and cellulosic material comprising a housing having opposite facing side walls, said housing including a first inlet opening in one of said side walls for introducing material into said housing, a discharge opening for discharging material from said housing, a drive shaft extending into said housing, impeller means connected to said drive shaft, said impeller means having opposite sides, shredding means connected to said drive shaft and being disposed between one side of said impeller means and said first inlet opening for shredding material passing into the housing through said inlet opening and reducing the size of the material, said housing including a second inlet opening in the other of said side walls for introducing material into said housing, said inlet openings introducing material into said housing from said opposite side walls with components of movement along said drive shaft in opposite directions, and chipper means disposed between the opposite side of said impeller means and said second inlet opening for chipping material passing into the housing through said second inlet opening, said impeller means forcing material from said shredding means and said chipper means toward said discharge opening.

10. Apparatus as defined in claim 9 including a feed hopper operatively associated with said first inlet opening for feeding material through said inlet opening and into said housing so that the apparatus serves as a shredder.

11. Apparatus as defined in claim 9 including a vacuum hose operatively associated with said first inlet opening so that the apparatus can be employed to gather material.

12. Apparatus as defined in claim 9 including first guard means operatively associated with said first inlet opening and a second guard means operatively associated with said discharge opening so that the apparatus serves as a blower.

13. Apparatus as defined in claim 9 including screen means disposed outwardly of said impeller means so that material passing radially outwardly from said impeller means impinges upon said screen means.

14. Apparatus for the size reduction of vegetable and cellulosic material comprising a housing, said housing including a first inlet opening for introducing material into said housing and a discharge opening for discharging material from said housing, a drive shaft extending into said housing, impeller means connected to said drive shaft, said impeller means having opposite sides, shredding means connected to said drive shaft and being disposed between one side of said impeller means and said first inlet opening for shredding material passing into the housing through said inlet opening and reducing the size of the material, said housing including a second inlet opening for introducing material into said housing, and chipper means disposed between the opposite side of said impeller means and said second inlet opening for chipping material passing into the housing through said second inlet opening, said impeller means including a backing plate at said opposite side thereof, said plate having an opening formed therethrough adjacent said chipper means for receiving chipped material from the chipper means so that the chipped material may pass through said opening in the plate to be forced outwardly by the impeller.

15. Apparatus as defined in claim 14 wherein said chipper means is supported on said opposite side of the impeller means.

16. Apparatus for the size reduction of vegetable and cellulosic material comprising a housing having opposite facing side walls, said housing including a first inlet opening in one of said side walls for introducing material into said housing, a discharge opening for discharging material from said housing, a drive shaft extending into said housing, impeller means connected to said drive shaft, said impeller means having opposite sides, shredding means connected to said drive shaft and being disposed between one side of said impeller means and said first inlet opening for shredding material passing into the housing through said inlet opening and reducing the size of the material, said housing including a second inlet opening in the other of said side walls for introducing material into said housing, said inlet openings introducing material into said housing from said opposite side walls with components of movement along said drive shaft in opposite directions, and chipper means disposed between the opposite side of said impeller means and said second inlet opening for chipping material passing into the housing through said second inlet opening, said impeller means forcing material from said shredding means and said chipper means toward said discharge opening, said housing including a cover hatch mounted for movement relative to said housing, a cover plate secured to said housing adjacent said inlet opening, and safety means interconnecting said cover hatch with said cover plate to delay opening of said cover hatch and access to the interior of the housing.

17. Apparatus for the size reduction of vegetable and cellulosic material comprising a housing, said housing including a first inlet opening for introducing material into said housing and a discharge opening for discharging material from said housing, a drive shaft extending into said housing, impeller means connected to said drive shaft, said impeller means having opposite sides, shredding means connected to said drive shaft and being disposed between one side of said impeller means and said first inlet opening for shredding material passing into the housing through said inlet opening and reducing the size of the material, said housing including a second inlet opening for introducing material into said housing, and chipper means disposed between the opposite side of said impeller means and said second inlet opening for chipping material passing into the housing through said second inlet opening, screen means disposed outwardly of said impeller means so that material passing radially outwardly from said impeller means impinges upon said screen means, said screen means being supported by said housing for movement toward and away from said impeller means during operation of the apparatus to prevent clogging of material between said impeller means and said screen means.

18. Apparatus as defined in claim 17 wherein said screen means is of substantially arcuate configuration including opposite end portions, one of said end portions being pivotally supported by said housing so that the screen means can pivot toward and away from said impeller means.

19. Apparatus as defined in claim 18 including stop means for engaging said screen means for limiting movement thereof toward said impeller means to prevent engagement of said screen means with said impeller means.

* * * * *